J. W. HERALD.
PROCESS OF MAKING SALVE.
APPLICATION FILED MAR. 13, 1911.
1,022,239.
Patented Apr. 2, 1912.
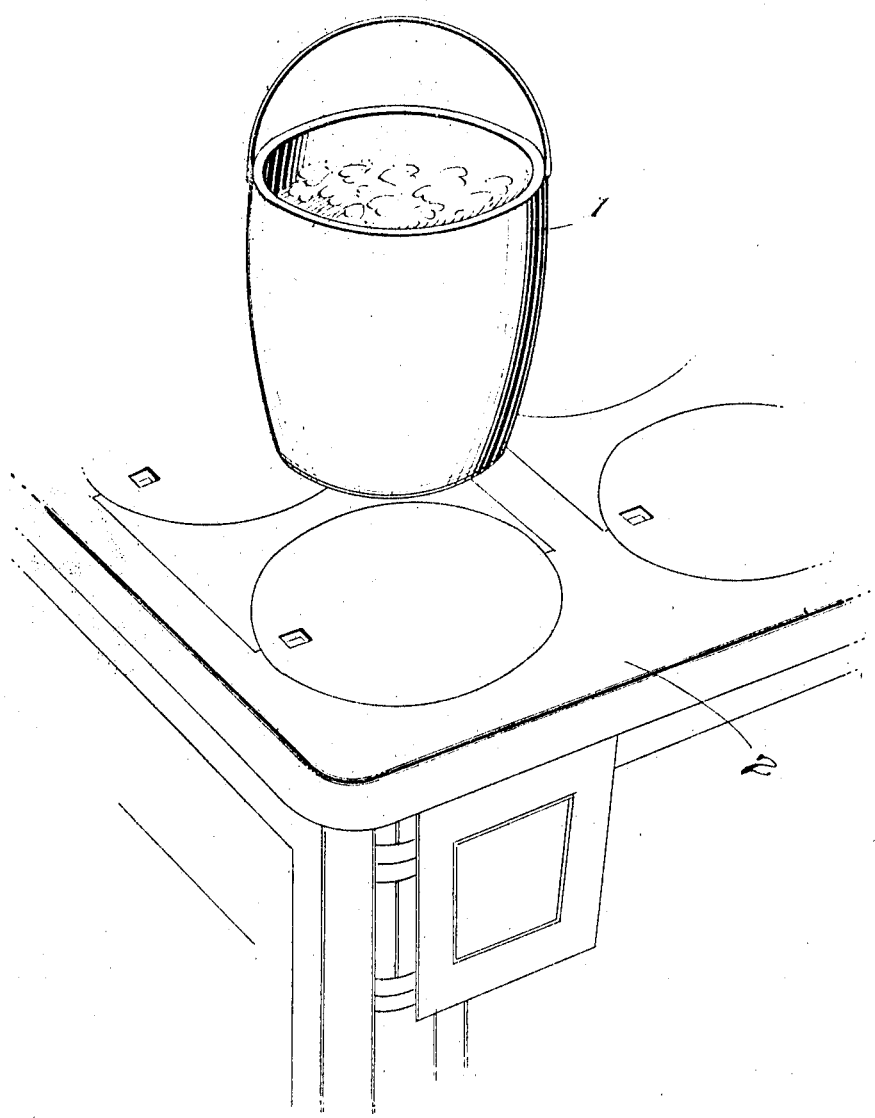
WITNESSES
INVENTOR
John W. Herald

UNITED STATES PATENT OFFICE.

JOHN W. HERALD, OF GALVESTON, TEXAS.

PROCESS OF MAKING SALVE.

1,022,239.  Specification of Letters Patent.  Patented Apr. 2, 1912.

Application filed March 13, 1911. Serial No. 614,082.

*To all whom it may concern:*

Be it known that I, JOHN W. HERALD, a citizen of the United States, residing at Galveston, in the county of Galveston and State of Texas, have invented certain new and useful Improvements in Processes of Making Salve, of which the following is a specification, reference being had therein to the accompanying drawing.

This invention relates to medicines, and the principal object of the same is to produce a paste for the treatment by exterior application of certain diseases.

The improved paste is made from an herb known as sheep-sorrel (*Oxalis acetosella*), which is thoroughly washed and boiled in pure rain water, then strained, and the boiling operation is repeated until the mass is reduced to a pulp, or paste. The proportions I have found best is two gallons of rain water to four pounds of the leaves and stems of the sheep-sorrel. These are placed in a copper receptacle, such as is designated by the numeral 1 on the accompanying sheet of drawings, and the receptacle seated on the stove 2, and the contents of the receptacle allowed to boil until their bulk is reduced to a half gallon. The mass is then strained, and the boiling operation resumed until the same is reduced to a paste, the bulk of which is ten ounces.

It is to be noted that during the boiling process the acid of the sorrel enters into combination with a certain portion of the copper of the vessel so that the resultant compound contains a certain portion of a chemical compound of oxalic acid and copper.

The improved paste is intended for external use, and is applied to the diseased portion in the manner common to the application of salves.

What I claim as my invention is:—

The process of making a medicinal paste which consists in boiling leaves and stems of *Oxalis acetosella* in rain water while in a copper receptacle, to reduce their bulk, then straining the same, and then repeating the boiling operation to reduce the same to a medicinal paste.

In testimony whereof I hereunto affix my signature in presence of two witnesses.

JOHN X W. HERALD.
his mark

Witnesses:
HENRY ENGELMEIER,
EMAR DAHL.